3,140,283
TRIARYLPHOSPHONIUM CYCLOPENTADIENYL-IDE METHINE DYES AND PHOTOGRAPHIC EMULSIONS SENSITIZED THEREWITH

Henri Depoorter and Jean Marie Nys, Mortsel-Antwerp, and André Emile van Dormael, Heverlee-Louvain, Belgium, assignors to Gevaert Photo-Producten N.V., Mortsel-Antwerp, Belgium, a Belgian company
No Drawing. Filed Oct. 23, 1959, Ser. No. 848,230
Claims priority, application Great Britain Oct. 24, 1958
1 Claim. (Cl. 260—240)

This invention relates to methine dyes and to methods for their production. It relates also to improvements in photographic emulsions and more particularly to the modification of their photographic properties including sensitization.

It is known to prepare methine dyes starting from compounds containing a reactive methyl- or methylene group, by condensing these compounds with suitable electrophilic intermediates, e.g. with compounds containing in a reactive position a halogen atom a betahalogenovinyl group, a cyano group, an alkyl- or arylmercapto group, a beta-alkyl- or beta-aryl-mercaptovinyl group, a beta-arylaminovinyl group, a beta-acetarylidovinyl group, an acylmethylidene group or a thioacylmethylidene group, an alkoxymethylidene group, an alkyl- or arylmercaptomethylidene group, an arylaminomethylidene group, an acetarylido methylidene group, with vinylene homologues of the above mentioned compounds, with heterocyclic or aromatic aldehydes, with orthocarboxylic acid esters, etc.

As compounds with reactive methyl group may be mentioned i.a. the quaternary salts of heterocyclic nitrogen bases, containing a methyl substituent at the carbon atom in the heterocyclic ring which is in the alpha- or gamma-position to the heterocyclic nitrogen atom; as compounds with reactive methylene group may i.a. be mentioned the heterocyclic ketomethylene compounds as well as the compounds containing, in open chain, a methylene group, the reactivity of which is enhanced by the presence of a negative group, such as a cyano group, a carboxylic acid group, a carboxylic acid ester group etc.

It is further known to prepare polymethine dyes starting from compounds containing a pyrrole nucleus by condensing them with one of the aforementioned compounds which are suitable for reaction with compounds containing a reactive methyl- or methylene group.

It is therefore an object of the present invention to provide an entirely new class of polymethine dyes. Another object is to provide methods for making these new polymethine dyes. Still another object is to provide photographic silver halide emulsions sensitized with these new dyes. Other objects will become apparent from a consideration of the following description and examples.

It has now been found that methine dyes of an entirely new class easily can be prepared by condensing a phosphine methylene compound as defined more particularly hereinafter with one of the intermediate compounds capable of reaction with compounds containing a reactive methyl- or methylene group.

The phosphine methylene compounds which, according to the present invention are used in the preparation of the new methine dyes, can be represented as resonance hybrids of the following extreme contributing structures

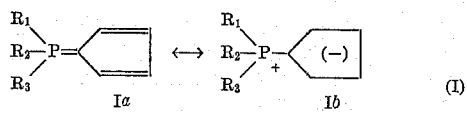

wherein $R_1$, $R_2$ and $R_3$ each represents an aryl radical such as phenyl and halogen substituted phenyl such as bromophenyl (e.g. a mononuclear aryl radical of the benzene series).

From the above formulae, Ia represents the homopolar form of the phosphine-methylene compound with pentacovalent structure for the phosphor atom and Ib summarizes the different possible dipolar forms with tetracovalent structure for the phosphor atom, such as

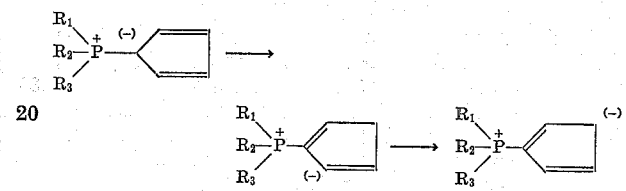

For designating the phosphine methylene compounds the structure of which has been explained just hereinbefore and which could be named cyclopentadienylidene phosphoranes as derivatives of phosphorane $PH_5$, the rather descriptive but generally accepted name phosphoniumcyclopentadienylides will be used in the present invention (see G. Wittig, Experientia, 12 (1956), 41, and F. Ramirez et al., Jl. Org. Chem., 22 (1957), 41, and Jl. Am. Chem. Soc., 79 (1957), 67–69).

The phospho-methylidene methine dyes of the present invention can be prepared by condensing a phosphine methylene compound with an electrophilic intermediate such as the cyanine-intermediate compounds capable of reaction with compounds containing a reactive methyl or methylene group.

The phosphonium cyclopentadienylides can be prepared according to F. Ramirez et al. in the above cited literature and in Jl. Amer. Chem. Soc., 79 (1957), 6167, by brominating cyclopentadiene which reaction product is then reacted with a triarylphosphine to obtain bisphosphonium bromides. By treating these bisphosphonium bromides with alkalihydroxide the corresponding phosphoniumcyclopentadienylides are obtained. The reaction scheme is as follows:

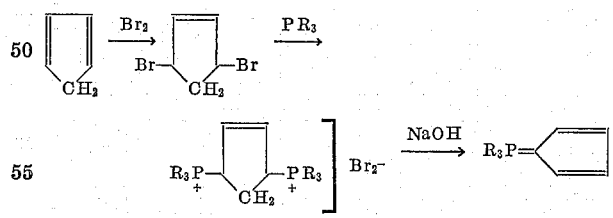

The bisphosphonium salts as well as the corresponding phosphoniumcyclopentadienylides can be applied as starting materials for the preparation of the new methine dyes. It is, however, not necessary to isolate the cyclopentadienylide. It can as well be formed in situ in the very synthesis of dye by causing the bisphosphonium salt to react in the presence of a base.

As stated hereinbefore, new methine dyes can be obtained according to the present invention by condensing a phosphonium cyclopentadienylide with a compound capable of reaction with compounds containing a reactive methyl- or methylene group, by application of the usual condensation techniques known to those skilled in the art.

The following more detailed description of some methods for preparing the new methine dyes according to the present invention is not complete and therefore is not to be regarded as limiting the scope of our invention but merely as a survey of the most usual condensation methods.

New non-ionoid methine dyes can be prepared according to the present invention by condensing a phosphonium cyclopentadienylide of the Formula I above with a compound of the formula

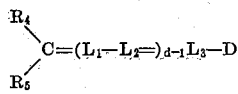

wherein $L_1$, $L_2$ and $L_3$ each represents a methine group such as $=CH-$, $=C.CH_3-$, $=C.C_2H_5-$, $=C.C_3H_7-$, $=C.CH_2C_6H_5-$, $=C.C_6H_5-$, $=C.O$-alkyl$-$, $=C.S$-alkyl$-$, $=C.Se$-alkyl$-$, $=C.O$-acyl$-$, $=C.COO-C_2H_5-$, $=C.NR'R''-$, $=C.NHCOR'$, $=C.CONHR'$ (wherein R' and R'' are hydrogen or have the same significance as set forth above for R), $=C.CONHC_6H_5-$, $=C.(CH=)_rD-$ wherein D represents a heterocyclic radical; $R_4$ and $R_5$ each represents a member selected from the group consisting of a cyanogroup and a lower alkyl carboxylate group such as methyl carboxylate and ethylcarboxylate. These radicals $R_4$ and $R_5$ can also form together a heterocyclic nucleus with negative character such as those of the pyrazolone series (e.g. 3-methyl-1-phenyl-5-pyrazolone, 1-phenyl-5-pyrazolone, 1-(2-benzothiazolyl)-3-methyl-5-pyrazolone etc.), those of the isoxazolone series (e.g. 3-phenyl-5(4H)-isoxazolone, 3-methyl-5(4H)-isoxazolone, etc.), those of the oxindole series (e.g. 1-alkyl-2,3-dihydro-2-oxindoles etc.), those of the 2,4,6-triketohexahydropyrimidine series (e.g. barbituric acid or 2-thiocarbituric acid as well as their 1-alkyl (e.g. 1-methyl, 1-ethyl, 1-n-propyl, 1-n-heptyl etc.), or 1,3-dialkyl (e.g. 1,3-dimethyl, 1,3-diethyl, 1,3-di-n-propyl, 1,3-di-isopropyl, 1,3-dicyclohexyl, 1,3-di(beta-methoxyethyl), etc.), or 1,3-diaryl (e.g. 1,3-di-phenyl, 1,3-di(p-chlorophenyl), 1,3-di(p-ethoxycarbonylphenyl), etc. or 1-aryl (e.g. 1-phenyl, 1-p-chlorophenyl, 1-p-ethoxycarbonylphenyl), etc.), or 1-alkyl-3-aryl (e.g. 1-ethyl-3-phenyl, 1-n-heptyl-3-phenyl etc.), derivatives, those of the rhodanine series (i.e. 2-thio-2,4-thiazolidinediones), such as rhodanine, 3-alkyl-rhodanines (e.g. 3-ethylrhodanine, 3-allylrhodanine etc.), or 3-arylrhodanines (e.g. 3-phenylrhodanine, etc.), those of the 2(3H)-imidazo 1,2-α-pyridone series, those of the 5,7-dioxo-6,7-dihydro-5-thiazolo 3,2-α pyrimidine series (e.g. 5,7-dioxo-3-phenyl-6,7-dihydro-5-thiazolo 3,2-α pyrimidine etc.), those of the 2-thio-2,4-oxazolidinedione series (i.e. those of the 2-thio-2,4-(3H, 5H)-oxazoledione series) (e.g. 3-ethyl-2-thio-2,4-oxazolidinedione etc.), those of the thionaphthenone series (e.g. 3-(2H)-thionaphthenone etc.), those of the 2-thio-2,5-thiazolidinedione series (i.e. the 2-thio-2,5-(3H,4H)-thiazoledione series) (e.g. 3-ethyl-2-thio-2,5-thiazolidinedione, etc.), those of the 2,4-thiazolidinedione series (e.g. 2,4-thiazolidinedione, 3-ethyl-2,4-thiazolidinedione, 3-phenyl-2,4-thiazolidinedione, 3-alpha-naphthyl-2,4-thiazolidinedione etc.), those of the thiazolidinone series (e.g. 4-thiazolidinone, 3-ethyl-4-thiazolidinone, 3-phenyl-4-thiazolidinone, 3-alpha-naphthyl-4-thiazolidinone etc.), those of the 4-thiazolinone series (e.g. 2-ethylmercapto-4-thiazolinone, 2-alkyl-phenylamino-4-thiazolinones, 2-diphenylamino-4-thiazolinone etc.), those of the 2-imino-2,4-oxazolinone (i.e. pseudohydantoin) series, those of the 2,4-imidazolinedione (hydantoin) series (e.g. 2,4-imidazolinedione, 3-ethyl-2,4-imadazolinedione, 3-phenyl-2,4-imidazolinedione, 3-alpha-naphthyl-2,4-imidazolinedione, 1,3-diethyl-2,4-imidazolinedione, 1-ethyl-3-phenyl-2,4-imidazolinedione, 1-ethyl-3-alpha-naphthyl-2,4-imidazolinedione, 1,3-diphenyl-2,4-imidazolinedione etc.), those of the 2-thio-2,4-imidazolinedione (i.e. 2-thiohydantoin) series (e.g. 2-thio-2,4-imidazolinedione, 3-ethyl-2-thio-2,4-imidazolinedione, 3-phenyl-2-thio-2,4-imidazolinedione, 3 - alpha-naphthyl-2-thio-2,4-imidazolinedione, 1,3-diethyl-2-thio-2,4-imidazolinedione, 1-ethyl-3 - phenyl - 2-thio - 2,4-imidazolinedione, 1-ethyl-3-alpha-naphthyl-2-thio-2,4-imidazolinedione, 1,3-diphenyl-2-thio-2,4-imidazolinedione etc.), those of the 5-imidazolinone series (e.g. 2-n-propylmercapto-5-imidazolinone etc.), etc. (especially a heterocyclic nucleus with negative character containing 5 to 6 atoms in the heterocyclic ring, 3 to 4 of said atoms being carbon atoms, 1 of said atoms being a nitrogen atom, and 1 of said atoms being selected from the group consisting of a nitrogen atom, an oxygen atom and a sulphur atom); d represents a positive integer from 1 to 9.

The condensation is advantageously carried out in the presence of a basic condensing agent, e.g. a trialkylamine such as triethylamine, a dialkylaniline, a heterocyclic tertiary amine such as pyridine, N-alkyl-piperidine or the like. The condensation can also be carried out in the presence of an inert diluent such as methanol, ethanol, acetone, 1,4-dioxane etc., occasionally but not necessarily in the presence of a basic condensing agent as set forth.

New polynuclear methine dyes can be prepared according to the present invention by application of the usual condensation technique and/or the methods for preparing the new methine dye salts as described in our copending application Serial No. 848,231, filed on even date herewith, or non-ionoid dyes as described hereinbefore, starting from the new methine dye salts and/or the new non-ionoid methine dyes and/or a phosphonium cyclopentadienylide of Formula I above.

This condensation may be carried out in the presence of a basic condensing agent as set forth above, as the case may be in the presence of an acid anhydride such as acetic anhydride. The reaction may also be carried out in the presence of an inert solvent as set forth above.

The following preparations are illustrative of the invention. The formulae and nomenclature given therein are thought to be correct and are included for the guidance of those skilled in the art, but should they later be found to require some modification, it must be understood that the compounds dealt with are sufficiently defined by their mode of preparation, irrespective of what their true structure may be.

*Preparation 1*

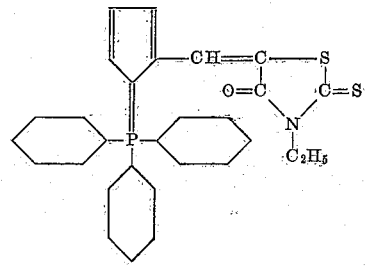

3.0 g. of 3-ethyl-5-(acetanilino-methylidene)-rhodanine, 3.3 g. of triphenyl phosphonium cyclopentadienylide, 30 cm.³ of acetic anhydride, and 1.4 cm.³ of triethylamine were heated for 20 min. at boiling temperature. Water was added to the cooled reaction mixture to give a precipitate which was digested with ethanol. The dye was recrystallized twice from n-propanol. Melting point: 240° C. Absorption maximum: 487 mμ.

Preparation 2

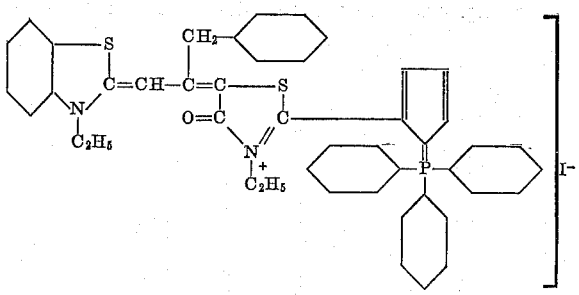

2.2 g. of [2(3-ethylbenzothiazole)][5(3-ethyl-rhodanine)] alpha'-benzyl-dimethine merocyanine and 9.6 g. of methyl-p-tolusulphonate were heated for 15 min. at 130° C. 1.6 g. of triphenyl phosphonium cyclopentadienylide were added to the reaction mixture which was further heated for 10 min. at 130° C. Thereafter 20 cm.³ of pyridine were added and the mixture further refluxed for 5 min. Ether was added to the cooled reaction mixture to give a precipitate which was dissolved in ethanol. The dye was precipitated as perchlorate, and it had a melting point of 282–283° after three crystallizations from ethanol. Absorption maximum: 606 mμ.

Preparation 3

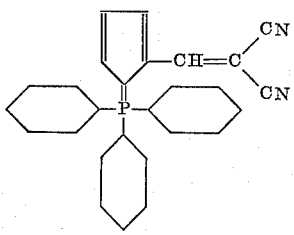

0.8 g. of anilinomethylidene malonitrile, 1.65 g. of triphenyl phosphonium cyclopentadienylide, 25 cm.³ of acetic anhydride and 1.4 cm.³ of triethylamine were agitated for 2 hours at room temperature. On dilution with water, the dye precipitated. Purification was performed by two crystallizations from n-propanol. Melting point: 199°. Absorption maximum: 402 mμ.

The new methine dyes which can be prepared according to the present invention belong to an entirely new class of methine dyes, which we tentatively have termed phosphomethylidene methine dyes, and which are characterized by the auxochromophore-system (see C. E. K. Mees, The Theory of the Photographic Process, N.Y., 1954, p. 373).

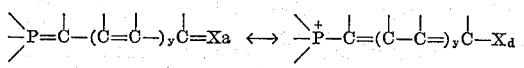

wherein X is an atom (or group of atoms) of a kind that can readily raise (or lower) its covalency by one, whereby $X_a$ acts as an electron-acceptor and $X_d$ as an electron-donor and $y$ is 0 or a positive integer. Having regard to the known electron-acceptor and electron donor atoms, $X_d$ may be e.g. a negatively charged oxygen atom (—O⁻) or a tertiary nitrogen atom

and $X_a$ may be e.g. a double bonded oxygen atom (=O—) or a quaternary nitrogen atom

It is evident, however, that the conjugated chain may also be terminated at both ends by a phosphomethylidene group according to the invention viz. $X_a$ may be the group

and $X_d$ may be the group

As shown in the above system, each dye molecule can be represented by different structural formulae, differing only in the way the bonding electrons are paired, and corresponding with different possible structures for the dye molecule. According to the resonance theory, these structures have no real existence, and the dye molecule is to be considered as being a resonance hybrid of the different contributing structures.

Although in most cases many other possible contributing structures are to be taken into account over the two extreme structures shown in the systems mentioned hereinbefore, for practical purposes the dye molecule is represented as a resonance hybrid of only two extreme structures.

Within the hereinbefore described new broad class of dyes there are important sub-classes; some typical sub-classes will now be given by way of example (the structure of the dyes is explained by giving only one structural formula corresponding to one of the different possible electromeric extreme structures).

(I) The dyes of one of the following general formulae:

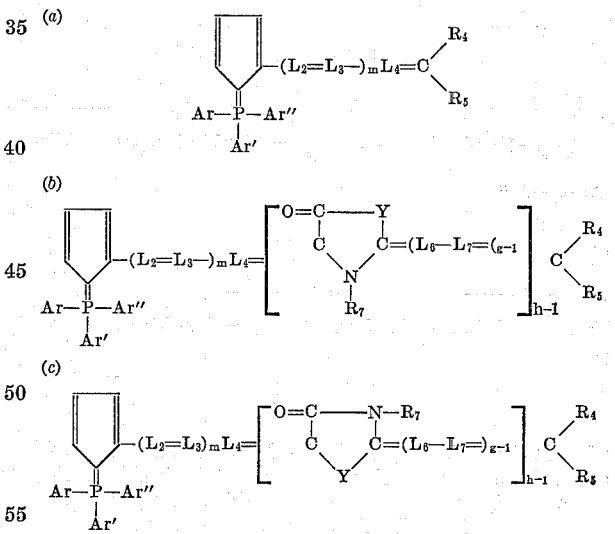

wherein Ar, Ar', Ar'' each represents a member of the group consisting of a phenyl nucleus and a halogen substituted phenyl nucleus such as bromophenyl; $L_2$ and $L_3$ each represents a methine group such as set forth above; $L_4$, $L_6$ and $L_7$ each represents a methine group and has the same values as set forth for $L_2$ and $L_3$; $R_4$ and $R_5$ have the same values as set forth above and $R_7$ represents a member selected from the group consisting of lower alkyl such as methyl, ethyl and propyl, aryl such as phenyl and halogen substituted phenyl, cycloalkyl and a heterocyclic radical such as quinolyl and pyridyl; Y represents a member selected from the group consisting of O, S, Se and N-$R_7$ wherein $R_7$ has the value as set forth above; $g$ represents a positive integer of from 1 to 4; $h$ represents a positive integer of from 2 to 4 and $m$ represents a positive integer of from 0 to 3.

(II) The dyes of one of the following general formulae:

(a)
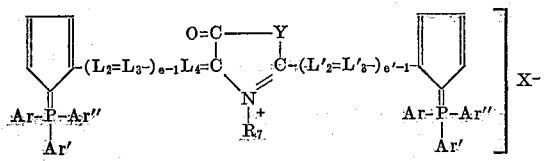

(b)
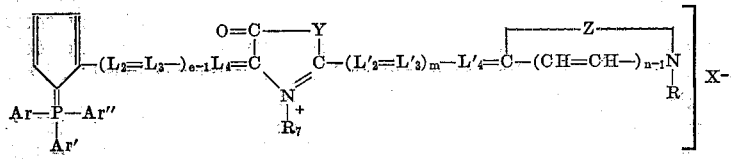

(c)
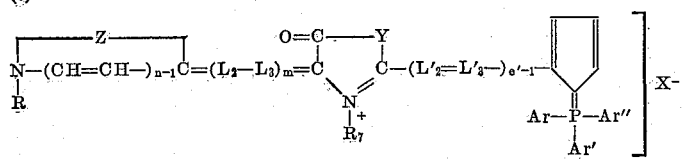

(d)
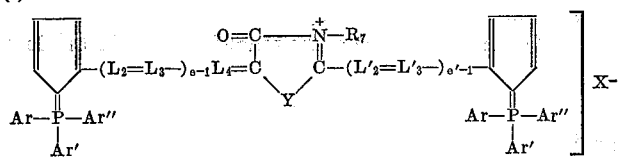

(e)
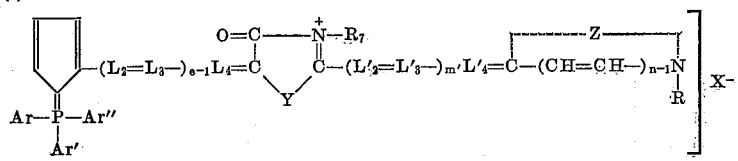

(f)
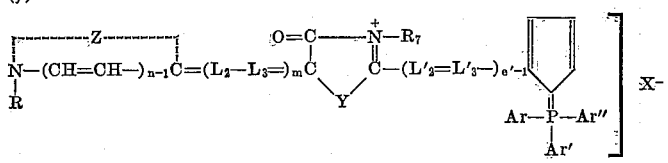

wherein Ar, Ar', Ar'', $L_2$, $L_3$, $L_4$, $L_6$, $L_7$, $R_4$, $R_5$, $R_7$, Y, h and m have the same significance as set forth above; $L'_2$, $L'_3$ and $L'_4$ each represents a methine group such as those described for $L_1$, $L_2$ and $L_3$; e and e' each represents a positive integer of from 1 to 8; m' has the same value as set forth above; n is a positive integer of from 1 to 2; X is an acid radical of the type used in the cyanine dyes such as chloride, bromide, iodide, perchlorate, benzene sulphonate, p-tolusulphonate, acetate, methylsulphate, ethylsulphate etc.; R represents an alkyl radical such as methyl, ethyl, propyl, isopropyl, butyl, isobutyl, allyl (vinyl methyl), betahydroxyethyl, benzyl (phenyl methyl), carboxy benzyl, the group

wherein A and B have the same significance as set forth in the co-pending application Ser. No. 742,713, now abandoned, the group —A—W—NH—V—B wherein A, W, V and B have the same significance as set forth in the co-pending application Serial No. 746,347, now abandoned, etc. (e.g. an alkyl radical of the formula

wherein p represents a positive integer from 1 to 4), an aryl radical of the benzene series or a cycloalkyl radical such as e.g. cyclohexyl; Z constitutes the atoms necessary to complete a member selected from the class consisting of 5-membered and 6-membered nitrogenous heterocyclic systems of the type usual in cyanine dyes such as those of the thiazole series (e.g. thiazole, 4-methylthiazole, 4-phenylthiazole, 5-methylthiazole, 5-phenylthiazole, 4,5-dimethylthiazole, 4,5-diphenylthiazole, 4-(2-thienyl)-thiazole, etc.), those of the benzothiazole series (e.g. benzothiazole, 4-chlorobenzothiazole, 5-chlorobenzothiazole, 6-chlorobenzothiazole, 7-chlorobenzothiazole, 4-methyl-benzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, 4,5,6,7-tetrahydrobenzothiazole, 5,6-dimethoxybenzothiazole, 5,6-dioxymethylenebenzothiazole, 5-hydroxybenzothiazole, 6-hydroxybenzothiazole, 5,6-dimethylbenzothiazole etc.), those of the naphthothiazole series (e.g. alpha-naphthothiazole, beta-naphthothiazole, 5-methoxy-beta-naphthothiazole, 5-ethoxy-beta-naphthothiazole, 8-methoxy-alpha-naphthothiazole, 7-methoxy-alpha-naphthothiazole etc.), those of the thionaphtheno 7',6',4,5-thiazole series (e.g. 4'-methoxy-thionaphtheno- 7',6',4,5-thiazole etc.), those of the oxazole series (e.g. 4-methyloxazole, 5-methyloxazole, 4-phenyloxazole, 4,5-diphenyloxazole, 4-ethyloxazole, 4,5-dimethyloxazole, 5-phenyloxazole, etc.), those of the benzoxazole series (e.g. benzoxazole, 5-chlorobenzoxazole, 5-methylbenzoxazole, 5-phenylbenzoxazole, 6-methylbenzoxazole, 5,6-dimethylbenzoxazole, 4,6-dimethylbenzoxazole, 5-methoxybenzoxazole, 6-methoxybenzoxazole, 5-hydroxybenzoxazole, 6-hydroxybenzoxazole, etc.), those of the naphthoxazole series (e.g. alpha-naphthoxazole, beta-naphthoxazole, etc.), those of the selenazole series (e.g. 4-methylselenazole, 4-phenylselenazole etc.), those of the benzoselenazole series (e.g. benzoselenazole, 5-chlorobenzoselenazole, 5-methoxybenzoselenazole, 5-hydroxybenzoselenazole, 4,5,6,7-tetrahydrobenzoselenazole etc.), those of the naphthoselenazole series (e.g. alpha-naphthoselenazole, beta-naphthoselenazole, etc.), those of the thiazoline series (e.g. thiazoline, 4-methylthiazoline, 4-hydroxymethyl-4-methylthiazoline, 4,4-bis-hydroxymethylthiazoline, 4-acetoxymethyl-4-methylthiazoline, 4,4-bis-acetoxymethylthiazoline, 2-benzothiazoylidene-4-thiazolidone etc.), those of the oxazoline series (e.g. oxazoline, 4-hydroxymethyl-4-methyloxazoline, 4,4-bis-hydroxymethyloxazoline, 4-acetoxymethyl-4-methyloxazoline, 4,4-bis-acetoxy-methyl-oxazoline, etc.), those of the selenazoline series (e.g. selenazoline), those of the 2-quinoline series (e.g. quinoline, 3-methylquinoline, 5-methylquinoline, 7-methylquinoline, 8-methylquinoline, 6-chloroquinoline, 8-chloroquinoline, 6-methoxyquinoline, 6-ethoxyquinoline, 6-hydroxyquinoline, 8-hydroxyquinoline etc.), those of the 4-quinoline series (e.g. quinoline, 6-methoxyquinoline, 7-methylquinoline, 8-methylquinoline etc.), those of the 1-isoquinoline series (e.g. isoquinoline, 3,4-dihydroisoquinoline etc.), those of the 3-isoquinoline series (e.g. isoquinoline etc.), those of the 3,3-dialkylindolenine series (e.g. 3,3-dimethylindolenine, 3,3,5-trimethylindolenine, 3,3,7-trimethylindolenine etc.), those of the pyridine series (e.g. pyridine, 5-methylpyridine etc.), those of the benzimidazole series (e.g. 1-ethylbenzimidazole, 1-phenylbenzimidazole, 1-ethyl-5,6-dichlorobenzimidazole, 1-hydroxyethyl-5,6-dichlorobenzimidazole, 1-phenyl-3-acetoxyethyl-5,6-dichlorobenzimidazole, 1-ethyl-5-chlorobenzimidazole, 1-ethyl-5,6-dibromobenzimidazole, 1-ethyl-2-methyl-5-phenylbenzimidazole, 1-ethyl-2-methyl-5-fluorobenzimidazole, 1-ethyl-2-methyl-5,6-difluorobenzimidazole, 1-ethyl-2-methyl-5-carboxybenzimidazole, 1-ethyl-2-methyl-7-carboxybenzimidazole, 1-ethyl-2-methyl-5-carbethoxybenzimidazole, 1-ethyl-2-methyl-7-carbethoxybenzimidazole, 1-ethyl-2-methyl-5-cyanobenzimidazole, 1-ethyl-2-methyl-5,6-dicyanobenzimidazole, 1-ethyl-2-methyl-5-sulphonamidobenzimidazole, 1-ethyl-2-methyl-5-N-ethyl-sulphonamidobenzimidazole, etc.).

From the above description of the most important sub-classes included within the new class of the phosphomethylidene methine dyes clearly appears that the extent of the class of the phosphomethylidene methine dyes according to the invention and the number of the dyes included therein are comparable to the well-known classes of merocyanine, rhodacyanine and polynuclear dyes which are known since years and are still in development. In this way, the new class of the phosphomethylidene methine dyes according to the invention does also include i.a. the phosphomethylidene methine dyes in the conjugated methine chain of which one or more methine groups are replaced by a nitrogen atom to give the corresponding aza-dyes.

The phosphomethylidene methine dyes of the present invention can be prepared by condensing a phosphine methylene compound with an electrophilic intermediate such as the cyanine-intermediate compounds capable of reaction with compounds containing a reactive methyl or methylene group.

Among the new phosphomethylidene methine dyes typical sub-classes of which are listed above, some comprise phosphomethylidene methine dyes which show interesting sensitizing properties for photographic light-sensitive silver halide emulsions. The most suitable representatives for this purpose are given by the general formulae of sub-classes II*b*, *c*, *e*, and *f*.

The sensitizing dyes of our present invention are characterized thereby that they contain an entirely new color conferring system. Indeed, according to the nature of their auxochromophores (G.E.K. Mees, The Theory of the Photographic Process, N.Y., 1954, p. 373) the dyes which have hitherto been used as optical sensitizers can be grouped into three main classes:

(1) The dyes containing the amidinium-system

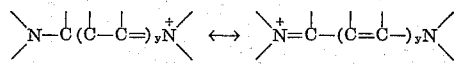

comprising i.a. the cyanine dyes, the styryl dyes, the neocyanine dyes, the hemicyanine dyes, the triphenylmethane dyes such as malachite green and the acridine dyes such as acridine orange.

(2) The dyes containing the formiate-ion system

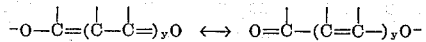

comprising i.a. the oxonol dyes and the phthaleine dyes such as erythrosine.

(3) The dyes containing the amide-system

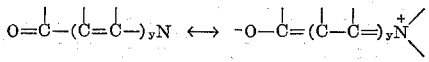

comprising i.a. the merocyanine dyes and the polymercocyanine dyes or dyes wherein two or more of the afore-mentioned systems are combined in one dye-molecule such as in the rhodacyanines, and that one or more methine groups in the conjugated chain may be replaced by a nitrogen atom to give the corresponding aza-dyes.

The main characteristic of the dyes of the three classes mentioned hereinbefore is the presence in their molecule of a conjugated chain terminated by atoms (or groups of atoms) of a kind that can readily raise (or lower) their covalency by one. In the above systems, the transition from one electromeric extreme structure into another involves next to a reversal of the sequence of double and single linkages a raising of the state of covalency by one of the atom which is in the lower state of covalency and a lowering of the state of covalency by one of the atom which is in the highest state of covalency. This transition is accompanied with a transfer of an electric charge from one end of the chain to the other, whereby the atom in the lower state of covalency acts as electron-donor and the atom in the higher state of covalency acts as an electron-acceptor.

It is generally known that only very few elements are capable of acting as electron acceptor or donor at the end of a conjugated chain in such a way that a dye-conferring system is obtained.

The choice of such elements which, because of an unsaturated electron pair, can function in two neighbouring states of covalency is virtually restricted to nitrogen, oxygen and sulphur (L. Brooker, Spectroscopy, Ann. Rev. Phys. Chem., 2 (1951), 123).

It is therefore a merit of the present invention for having surprisingly found that colour-conferring systems can also be obtained by terminating the conjugated chain by the group —C=P as electron-donor and/or by the group =C—P+— as electron-acceptor group.

As stated hereinbefore some phosphomethylidene methine dyes of the present invention can be used for controlling or modifying the spectral sensitivity of photographic emulsions. In this way, some new phosphomethylidene methine dyes according to the present invention may be used for extending the spectral sensitivity of photographic silver halide emulsions, the natural sensitivity of light of which is restricted to a short range of wave lengths in the ultraviolet and/or violet and/or blue regions of the spectrum, to light of other wave lengths or to enhance the natural sensitivity in a well defined part of the spectrum, e.g. in the blue range. Since as shown in the above description there is an extraordinary number of dyes falling within the scope of the present invention; one of the great advantages of the present invention is that we have provided an unusually comprehensive range sensitizers extending over the whole spectrum.

For optically sensitizing photographic silver halide emulsions by using one or more of the phosphomethylidene methine dyes according to the present invention, the dye, or dyes can be incorporated in the photographic emulsion by one of the methods customarily employed in the art. In practice, it is convenient to add the dyes to the emulsion in the form of a solution in an appropriate solvent. The dyes are advantageously incorporated in the finished washed emulsions and should be uniformly distributed throughout the emulsion. The concentration of the dyes in the emulsion can vary widely, for example from 1 to 100 mg. per kg. of flowable emulsion and will vary according to the effect desired. The suitable and most economical concentration for any given emulsion will be apparent to those skilled in the art, upon making the ordinary tests and observations customarily used in the art of emulsion making.

The dyes may, if desired, also be added to the emulsion by the well-known expedient of bathing the coated emulsion in a solution of the dye.

The new polymethine dyes can be incorporated in photographic emulsions the general sensitivity of which has been increased by physical and chemical ripening. As suitable chemical sensitizers may be mentioned the well-known sulphur sensitizers such as allylisothiocyanate, allylthiourea and sodium thiosulphate, potassium selenocyanide and the natural sensitizers originating in the gelatin, reducing sensitizers such as the imino-amino-methane sulphinic acid and the derivatives thereof, the salts of noble metals such as gold, platinum and palladium and the polyoxyalkylene derivatives.

The photographic emulsions optically sensitized according to the invention may further be supersensitized and/or hypersensitized by one of the methods known to those skilled in the art.

In preparing the photographic emulsions according to the invention, the usual addenda such as antifogging agents, stabilizers, anti-bronzing agents, hardeners, wetting agents, plasticizers, development accelerators, color couplers, fluorescent brighteners and ultraviolet screening compounds can moreover be incorporated in the emulsion in the manner customarily employed in the art.

Emulsions sensitized with the new polymethine dyes can be coated in the usual manner on a suitable support such as glass, cellulose derivative film, resin film or paper.

The following examples are illustrative of the invention. In view of a good surveyability, they are given in a table. The dyes of the different preparations have been incorporated in silver halide emulsions with gelatin as binding agent.

| Dye of preparation | Kind of silver halide | Quantity of dye added per kg. emuls., mg. | Sensitization maximum in mμ | Sensitization range in mμ |
| --- | --- | --- | --- | --- |
| 1 | Chlorobromide | 20 | 550 | to 600 |
| 2 | Bromoiodide | 20 | 640 | 670 |

Although as shown in the above examples, the new phosphomethylidene methine dyes are useful especially for extending the spectral sensitivity of the customarily employed gelatino silver chloride, gelatino silver chlorobromide, gelatino silver bromide, gelatino silver bromoiodide and gelatino silver chlorobromoiodide emulsions, photographic emulsions containing water-permeable colloids other than gelatin, such as agar-agar, zeine, collodion, water-soluble cellulose derivatives, polyvinyl alcohol or other hydrophilic synthetic or natural resins or polymeric compounds, may equally well be sensitized according to the present invention.

From the sensitization characteristics shown in the above examples clearly appears that the phosphomethylidene methine dyes of the present invention are useful, not only in the preparation of orthochromatic and panchromatic emulsions for black-and-white photography and cinematography, including emulsions to be used in the graphic and document reproduction field or for X-ray photography by means of fluorescent screens, but also where different emulsions are required having different sensitivities to different colors (as distinct from general sensitivity over the whole spectrum) such as e.g. for use in multi-layer or multi-particle films for color photographic purposes.

Some of the phospho-methylidene methine dyes of the present invention have also been found to enhance the sensitivity of photographic silver halide emulsions, for long wave length radiations such as infrared rays, for short wave length radiations such as e.g. X-rays and γ-rays or for corpuscular rays such as α-rays and β-rays.

It has further been found that by using some of the phosphomethylidene methine dyes of the present invention, in combination with some other particular dyes belonging to the known classes or to our new class of methine dyes, a supersensitizing effect is obtained.

Some of the phosphomethylidene methine dyes prepared according to the present invention have been found to be also very useful for other applications involving an energy-transfer, e.g. in electro-photographic system as photoconductors or for modifying the spectral sensitivity of the usual photoconductors such as ZnO, in photopolymerization processes etc.

Some other phosphomethylidene methine dyes of the present invention, especially those containing a nitro-substituent, have been found to decrease the sensitivity of silver halide emulsions to light of the longer wave lengths and can therefore be used as desensitizers in photographic emulsions, or in photographic baths for facilitating the treatment of the exposed photographic materials, or for increasing the contrast in direct positive emulsions, e.g. as described in our British specification No. 821,251.

Further applications for some of the phosphomethylidene methine dyes prepared according to the present invention can be found in the medical and clinical field, in the plastics industry for preventing the polymeric substances from deterioration by U.V. radiation, in the packaging field in the preparation of U.V. radiation absorbant transparent sheets, in the photographic industry, apart from the already mentioned application for modifying the spectral sensitivity of photographic silver halide emulsions, for light-screening and/or U.V. radiation absorbing purposes in photographic materials for black-and-white or color photography, e.g. in anti-abrasion, filter or antihalation layers, or in light-sensitive silver halide emulsion layers.

We claim:

A polymethine dye selected from the group consisting of the formulae:

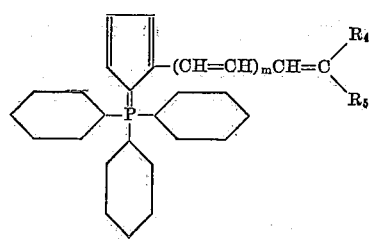

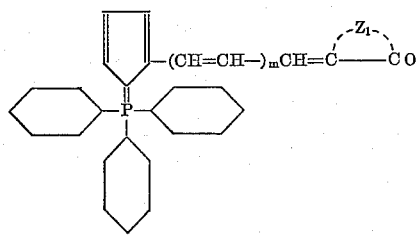

and

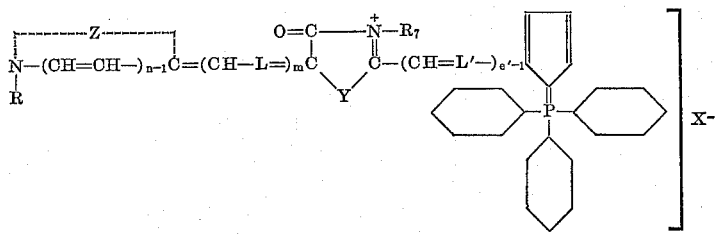

wherein R and $R_7$ each represents lower alkyl radical, $R_4$ and $R_5$ each represents a member selected from the group consisting of cyanogroup and lower alkyl carboxylate group, $Z_1$ constitutes the non-metallic atoms necessary to complete a nitrogenous heterocyclic nucleus selected from the consisting of a pyrazolone nucleus, an isoxazolone nucleus, an oxindole nucleus, a 2,4,6-triketohexahydropyrimidine nucleus, a rhodanine nucleus, a 2(3H)-imidazo 1,2-α pyridone nucleus, a 5,7-dioxo-6,7-dihydro-5- thiazolo 3,2-α pyrimidine nucleus, a 2-thio-2,4-oxazolidinedione nucleus, a thionaphthenone nucleus, a 2-thio-2,5-thiazolidinedione nucleus, a 2,4-thiazolidinedione nucleus, a thiazolidinone nucleus, a 4-thiazolinone nucleus, a 2-imino-2,4 oxazolinone nucleus, a 2,4-imidazolinedione (hydantoin) nucleus, a 2-thio-2,4-imidazolinedione nucleus and a 5-imidazolinone nucleus, Z constitutes the non-metallic atoms necessary to complete a nitrogenous heterocyclic nucleus selected from the group consisting of a thiazole nucleus, a benzothiazole nucleus, a naphthothiazole nucleus, a thionaphtheno-thiazole, an oxazole nucleus, a benzoxazole nucleus, naphthoxazole nucleus, selenazole nucleus, benzoselenazole nucleus, naphthoselenazole nucleus, thiazoline nucleus, thiazolidine nucleus, oxazoline nucleus, oxazolidine nucleus, selenazoline nucleus, quinoline nucleus, isoquinoline nucleus, dialkylindolenine nucleus, pyridine nucleus and benzimidazole nucleus; L and L' each represents a member selected from the group consisting of methine and

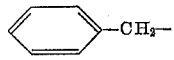

substituted methine; X is an acid radical of the type used in cyanine dyes; Y represents a member selected from the group consisting of O, S, Se and N—$R_7$ wherein $R_7$ has the value as set forth above; $e'$ represents a positive integer selected from the group consisting of 1, 2, 3, 4, 5-6, 7 and 8; $m$ represents a positive integer selected from the group consisting of 0, 1, 2, and 3 and $n$ represents a positive integer selected from the group consisting of 1 and 2.

References Cited in the file of this patent
UNITED STATES PATENTS

| | | |
|---|---|---|
| 2,153,169 | Brooker | Apr. 4, 1939 |
| 2,177,401 | Brooker | Oct. 24, 1939 |
| 2,691,581 | Knott | Oct. 12, 1954 |
| 2,838,504 | Crounse | June 10, 1958 |
| 2,914,522 | Ramirez | Nov. 24, 1959 |
| 2,930,814 | Ramirez | Mar. 29, 1960 |

OTHER REFERENCES

Chemical Abstracts, 16, 3101 (1922).
Chemical Abstracts, 19, 530 (1924).